United States Patent [19]

Inoue et al.

[11] Patent Number: 4,890,168

[45] Date of Patent: Dec. 26, 1989

[54] PROGRAM SCAN APPARATUS FOR VTR UTILIZING PICTURE-IN-PICTURE DISPLAY

[75] Inventors: Hajime Inoue, Kobe; Mikio Tanaka, Daitou, both of Japan

[73] Assignee: Sanyo Electric Co., Ltd., Moriguchi, Japan

[21] Appl. No.: 195,933

[22] Filed: May 19, 1988

[30] Foreign Application Priority Data

May 20, 1987 [DE] Fed. Rep. of Germany ......... 123570

[51] Int. Cl.$^4$ .......................................... H04N 5/782
[52] U.S. Cl. ...................................... 358/335; 358/183
[58] Field of Search ...................... 358/22, 183, 191.1, 358/193.1, 335; 360/72.1

[56] References Cited

U.S. PATENT DOCUMENTS

| | | | |
|---|---|---|---|
| 4,621,259 | 11/1986 | Schepers et al. | 358/183 X |
| 4,665,438 | 5/1987 | Miron et al. | 358/183 |
| 4,665,439 | 5/1987 | Naimpally | 358/183 |
| 4,729,027 | 3/1988 | Hakamada et al. | 358/183 |

FOREIGN PATENT DOCUMENTS 59-201249 11/1984 Japan .
62-141873 6/1987 Japan .

Primary Examiner—Robert L. Richardson
Attorney, Agent, or Firm—Armstrong, Nikaido, Marmelstein, Kubovcik & Murray

[57] ABSTRACT

A VTR is responsive to designation of an index scan mode for detecting an index signal recorded on a control track of a tape with the tape being traveled at high speed. During high-speed traveling, a video signal received by a contained tuner is outputted and applied to a monitor receiver. Every time the index signal is detected, the starting portion of each recorded program is reproduced in a normal reproducing mode during a short time period and time-base compressed, to be combined with the above described received video signal. The combined video signal for picture-in-picture display is applied to the monitor receiver externally provided, so that a received video signal is displayed on a main screen while a reproduced video signal is displayed on a subscreen. When a short time period elapsed, PIP control is cancelled, so that a high-speed traveling mode is established until the next index signal is detected. When a user turns an operation mode setting switch on, the contents recorded on the tape can be monitored in various desired modes so long as the operation mode setting switch is turned on, irrespective of the mode.

8 Claims, 8 Drawing Sheets

FF MODE

FIG.8B

REW MODE

PROGRAM SCAN APPARATUS FOR VTR UTILIZING PICTURE-IN-PICTURE DISPLAY

BACKGROUND OF THE INVENTION

1. Field of the Invention

The present invention relates generally to an index scan system in a video tape recorder (referred to as VTR hereinafter), and more particularly, to an index scan system in a VTR comprising an index scan function of searching at high speed the starting portion of each program recorded on a magnetic tape in response to an index signal indicating the starting position of the program and a picture-in-picture function (referred to as PIP function hereinafter) of forming a video signal for picture-in-picture display to output the same.

2. Description of the Prior Art

The conventional VTR of a VHS (Video Home System) type includes a VTR comprising a so-called index scan function of performing pulse-width modulation of a control signal in response to an index signal indicating the starting position of each program recorded on a magnetic tape and recording the same, to search the recorded program utilizing such an index signal. As such an index scan function, a VISS (Video Index Search System) utilizing only an index signal or a VASS (Video Address Search System) utilizing an address signal indicating an absolute address of a tape in addition to the above described index signal is generally employed. The VTR with such an index scan function is described in, for example, Japanese Patent Laying-Open Gazette No. 201249/1984 and "Electronics Life", Journal issued by NHK, Mar. 1987, pp. 123–126.

More specifically, in the VTR with the above described index scan function, a control track having a control signal recorded thereon is formed on a magnetic tape to control traveling of the tape. The duty ratio of the control signal (pulse) is changed depending on, for example, the data contents of an index signal so that the starting position of each recorded program is indicated. More specifically, in such a VTR even in a fast forward mode (FF mode) or a rewind mode (REW mode) in which a tape is travelled at high speed by half-loading control, the tape is travelled with a control head for recording and reproducing of a control track being contact with a control track of the tape. In particular, when an index scan mode is set, the change of the duty ratio of the control signal, i.e., the index signal is detected by the control head during high-speed traveling of the tape, so that the tape is controlled to be travelled in a normal reproducing mode only in a short time period (for example, for five seconds) by reversing the tape by a constant amount or without reversing the tape every time the index signal is detected, to reproduce the starting positions of the recorded programs in order.

On the other hand, the conventional VTR includes a VTR comprising a PIP function of performing time-base compression of either one of a video signal reproduced from a magnetic tape and a video signal received by a TV tuner contained in the VTR or a video signal externally inputted and combining the same with the other video signal, to form a video signal for picture-in-picture display in which a subscreen is inserted into a part of a main screen and output the same. The VTR with such a PIP function is described in, for example "Sanyo Technical Review" issued February 1987, Vol. 19, No. 1, pp. 76–84.

The conventional VTR with the above described index scan function is adapted such that the output of the received video signal is interrupted to output the reproduced video signal every time the index signal is detected during the index scan mode. More specifically, monitoring of the screen caused by the received video signal or the externally inputted video signal is interrupted every time the recorded program is reproduced, which is very inconvenient for practical usage.

Additionally, a VTR has been put into practice in which reproduced pictures are sequentially reduced and displayed every time the index signal is detected, to form a plurality of subscreens without forming the above described main screen in the VTR with the above described index scan function. Such a VTR is disclosed in, for example, Japanese Patent Laying-Open Gazette No. 141873/1987. However, in such a VTR, the screen caused by the received video signal from the contained TV tuner or the externally inputted video signal.

SUMMARY OF THE INVENTION

Therefore, an object of the present invention is to provide an index scan system in a video tape recorder which can perform index scanning of a tape while monitoring a received video signal.

Another object of the present invention is to provide an index scan system in a video tape recorder which has both an index scan function and a PIP function and can operate simultaneously both the functions.

Still another object of the present invention is to provide an index scan system in a video tape recorder in which a user can monitor the contents of a tape in arbitrary timing during an index scan mode of the tape.

A further object of the present invention is to provide an index scan system in a video tape recorder which can display in a monitor screen the scanning direction in an index scan mode of a tape.

Briefly stated, the present invention is directed to an index scan system in a video tape recorder for reproducing the contents recorded on a magnetic tape having an index signal recorded thereon in the starting position of each recorded program, which is responsive to setting of an index scan mode for traveling the magnetic tape at high speed in either one of a positive direction and a reverse direction, selects a video signal received by a tuner contained in the video tape recorder during high-speed traveling of the magnetic tape to output the same, reproduces the starting portion of each recorded program during a short time period every time the index signal is detected during the high-speed traveling, and selects a video signal for picture-in-picture display comprising the received video signal corresponding to a main screen and a reproduced video signal corresponding to a subscreen to output the same.

In accordance with another aspect of the present invention, in the period during which setting means of any of a normal reproducing mode, a cue reproducing mode and a review reproducing mode is operated, an index mode is interrupted and the video tape recorder is set in a corresponding reproducing mode, so that the video signal for picture-in-picture display is selected and outputted.

In accordance with still another aspect of the present invention, the display position of the subscreen depends on the high-speed traveling direction of the magnetic tape.

In accordance with a further aspect of the present invention, the display position of the subscreen is moved depending on the high-speed traveling direction of the magnetic tape.

Thus, a principal advantage of the present invention is that the index scan function and the PIP function are simultaneously operated, so that index scanning of the tape can be performed while monitoring the received video signal, whereby operation efficiency of the video tape recorder can be significantly improved.

Additionally, another advantage of the present invention is that the contents recorded on the tape can be reproduced in a normal manner for a desired time period in arbitrary timing irrespective of the operation mode, so that a user can monitor the contents recorded on the tape as required.

Additionally, still another advantage of the present invention is that it can be determined which direction the tape is traveling at high speed depending on the display position or the shifting direction of a subscreen during index scan mode.

These objects and other objects, features, aspects and advantages of the present invention will become more apparent from the following detailed description of the present invention when taken in conjunction with the accompanying drawings.

DESCRIPTION OF THE PREFERRED EMBODIMENT

Figure 1:
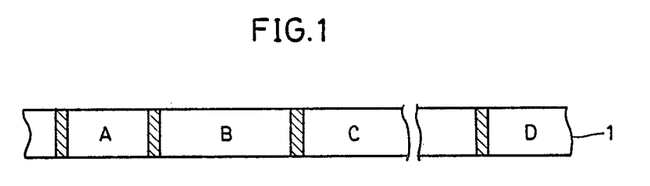
FIG. 1 is a typical diagram for explaining the position where each program and each index signal are recorded on a magnetic tape.

FIG. 1 is a typical diagram for explaining the position where each recorded program and each index signal are recorded on a magnetic tape. In FIG. 1, index scan signals of the above described VASS are recorded on control tracks (not shown) corresponding to hatched portions immediately before the respective starting positions of recorded programs A, B, C and D formed on a tape 1. More specifically, a control signal for controlling tape traveling is recorded on a control track (not shown) formed in one side portion of the tape 1 shown in FIG. 1. However, the duty ratio itself of the control signal (pulse) is not related to control of the tape traveling. At the time of recording, the duty ratio of the control pulse is changed depending on the data contents of an index signal and an address signal such that it is 27.5% with respect to data "1" and 60% with respect to data "0", for example, to record the control pulse. The change of the duty ratio of the control pulse thus recorded is detected by a control head (not shown) in the index scan mode, to retrieve the starting position and an address of each recorded program.

Figure 2:
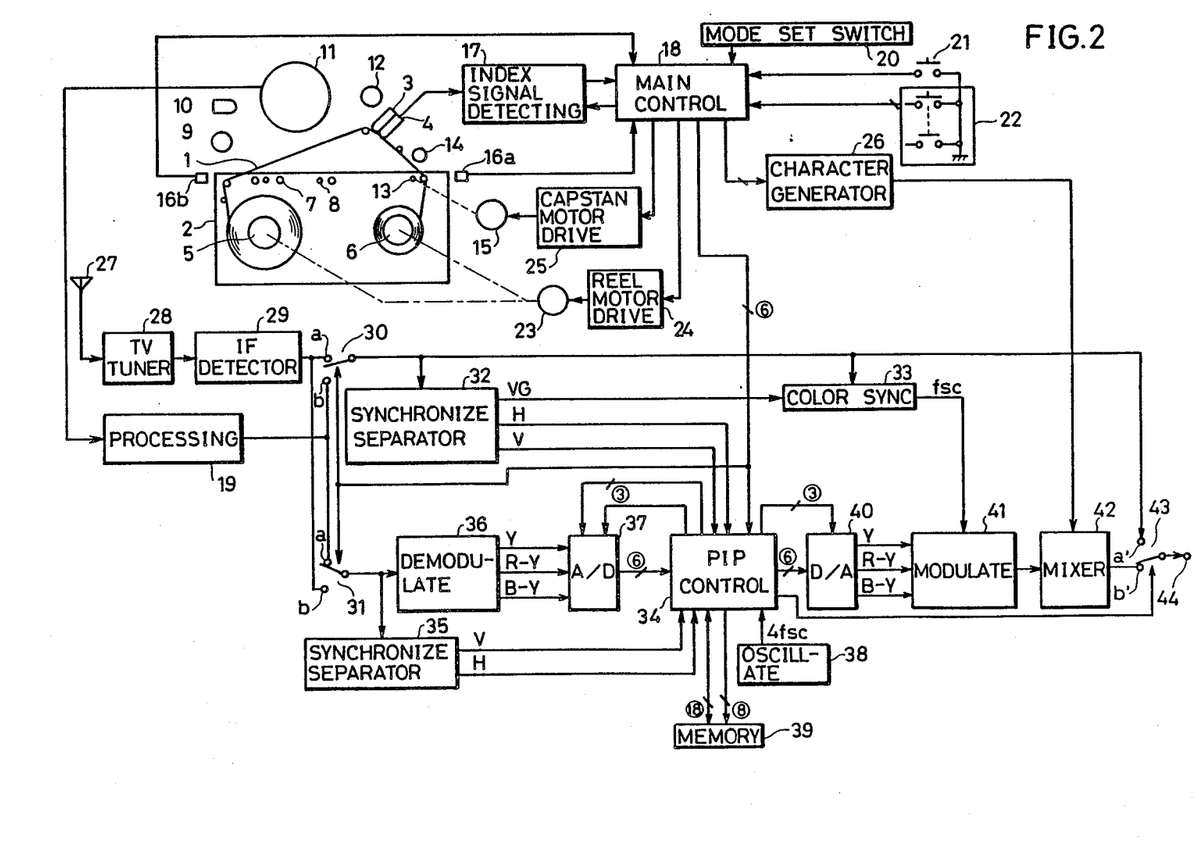
FIG. 2 is a schematic block diagram showing a VTR according to an embodiment of the present invention.

FIG. 2 is a schematic block diagram showing a VTR according to an embodiment of the present invention. The VTR shown in FIG. 2 generally comprises a circuit for index scanning, a circuit for PIP processing and a control circuit for simultaneously operating these circuits.

Description is now made on structure of the circuit for index scanning in the VTR. The structure of circuit for index scanning generally comprises a loading mechanism, a detecting circuit of an index signal and a main control circuit. In FIG. 2, a magnetic tape 1 is contained in a video cassette 2 of a VHS tape. FIG. 2 shows a state in which the magnetic tape 1 is loaded in a half-loading state for fast forwarding or rewinding by the loading mechanism (not shown). In the half-loading state at the time of such fast forwarding or rewinding, the magnetic tape 1 travels at high speed from a supply reel 5 to a takeup reel 6 or vice versa while being in contact with a fixed head (AE head) 3 for erasing an audio track and a fixed head (AC head) 4 for recording and reproducing the audio track and a control track. On the other hand, if and when guides 7 and 8 move to predetermined positions so that the magnetic tape 1 is loaded in a normal loading state for recording and reproducing, it is assumed that the magnetic tape 1 comes in contact with an impedance roller 9 and a full-track erase head 10, is wound around a head drum 11 over an angle of approximately 180°, and further travels from the supply reel 5 to the takeup reel 6 while being in contact with an impedance roller 12, the AE head 3 and the AC head 4. In such a normal loading state, a pinch roller 14 moves towards capstan shaft 13, to press the magnetic tape 1 on the capstan shaft 13. Consequently, the traveling speed of the tape 1 is controlled to be a recording and reproducing speed defined by rotation of a capstan motor 15.

A tape top detecting sensor 16a and a tape end detecting sensor 16b each comprising an optical sensor are disposed in the vicinity of the video cassette 2. The former detects the passage of a leader portion having no magnetic material adhered thereto, in the top of the tape 1 to generate a tape top detecting signal while the latter detects the passage of the end of the tape also having no magnetic material adhered thereto to generate a tape end detecting signal. The tape top and end detecting signals are applied to a main control circuit 18. In addition, a reproduced signal from the AC head 4 is applied to an index signal detecting circuit 17. The index signal detecting circuit 17 detects an index signal recorded on the control track of the tape to generate an index detecting signal, and identifies by the address signal the starting position which the detected index signal indicates, of the starting positions of the programs recorded on the tape 1, to output identification data, together with the index detecting signal, to the main control circuit 18.

A pair of rotary heads (not shown) for helically scanning the video track of the tape 1 to record and reproduce the same in an azimuth scheme is disposed in positions spaced apart from each other by 180° around the head drum 11. A reproduced signal reproduced by the pair of heads is applied to a reproduced signal processing circuit 19, to be converted into a reproduced video signal.

The main control circuit 18 has a control function for the above described loading mechanism, tape traveling, and a PIP function as described below. The main control circuit 18 receives detection signals from the sensors 16a and 16b as described above and the identification data from the index signal detecting circuit 17, as well as a setting signal of an operation mode setting switch 20 for designating various operation modes of the VTR such as recording and reproducing, a setting signal of an index scan mode setting switch 21 for setting an index scan mode, and a designating signal of an address designating switch 22 comprising a so-called ten-key switch for addressing a desired recorded program.

On the other hand, the main control circuit 18 is responsive to the input signals for applying driving control signals to a reel motor driving circuit 24 for driving a reel motor 23 for rotating the reels 5 and 6 and a capstan motor driving circuit 25 for driving the capstan motor 15, respectively. In addition, the main control circuit 18 applies a control signal for displaying the identified address to a character generator 26 for forming address numbers and characters, and further outputs a PIP control signal of 6 bits to control the PIP function as described below.

Description is now made on structure of a PIP circuit (picture-in-picture screen forming means) in the VTR shown in FIG. 2. In FIG. 2, a television signal received by TV receiving antenna 27 and a TV tuner 28 is applied to an IF (intermediate frequency) detector circuit 29. The detector circuit 29 IF-amplifies and detects the received television signal outputted from the TV tuner 28, to output the received video signal. Each of switches 30 and 31 is a switch having two contacts a and b for displaying a picture-in-picture screen comprising a main screen and a subscreen. The received video signal from the detector circuit 29 is inputted to the contact a of the switch 30 and the contact b of the switch 31, and the reproduced video signal from the reproduced signal processing circuit 19 is inputted to the contact b of the switch 30 and the contact a of the switch 31. The switches 30 and 31 are driven together, so that each of the switches 30 and 31 is switched between the contacts a and b in response to the PIP control signal from the main control circuit 18. Consequently, a video signal for the main screen and a video signal for the subscreen are outputted from the switches 30 and 31, respectively.

Then, a synchronizing separator circuit 32 is connected to a switching piece of the switch 30. The synchronizing separator circuit 32 separates a burst gate pulse VG, a horizontal synchronizing signal H and a vertical synchronizing signal V in the video signal for the main screen outputted from the switch 30, to output the same. The burst gate pulse VG is applied to a color synchronizing circuit 33, and a horizontal and vertical synchronizing signals H and V are applied to a PIP control circuit 34 as described below.

On the other hand, a synchronizing separator circuit 35 and a demodulator circuit 36 are connected to a switching piece of the switch 31. The synchronizing separator circuit 35 separates a horizontal synchronizing signal H and a vertical synchronizing signal V in the video signal for the subscreen outputted from the switch 31, to output the same. The horizontal synchronizing signal H and the vertical synchronizing signal V are applied to PIP control circuit 34. In addition, the demodulator circuit 36 demodulates the video signal for the subscreen outputted from the switch 31 into a luminance signal Y and color difference signals R-Y and B-Y (R and B are primary color signals of red and blue signals, respectively), to separate and output the same.

Each output of the demodulator circuit 36 is applied to an A/D converter circuit 37 with a multiplexing function. The A/D converter circuit 37 substantially comprises a single A/D converter of 6 bits. The A/D converter circuit 37 is responsive to a multiplex control signal of 3 bits applied from the PIP control circuit 34 for converting the luminance signal Y and the color difference signals R-Y and B-Y inputted from the demodulator circuit 36 in a dot sequential manner by repeating sequential high-speed selection of the inputted signals. Furthermore, the A/D converter circuit 37 is responsive to an A/D clock signal applied from the PIP control circuit 34 for converting into digital data of 6 bits the above described luminance signal Y and color difference signals R-Y and B-Y as converted in a dot sequential manner, respectively.

Then, the PIP control circuit 34 has a PIP function of inserting into the main screen video signal the subscreen video signal outputted from the switch 31. More specifically, the PIP control circuit 34 receives a PIP control signal of 6 bits from the main control circuit 18, the horizontal and vertical synchronizing signals H and V from the synchronizing separator circuit 32, the horizontal and vertical synchronizing signals H and V from the synchronizing separator circuit 35, and a control signal having a frequency of 4 $f_{SC}$ ($f_{SC}$: frequency of a color subcarrier of about 3.6 MHz) from an oscillator 38. In addition, the PIP control circuit 34 outputs an address signal of 8 bits, to access at random a memory 39 for time-base compression comprising a digital picture memory. The PIP control circuit 34 writes in parallel to the memory 39 the luminance signal Y and the color difference signals R-Y and B-Y which are all converted into the digital data of 6 bits by the A/D converter circuit 37 in a 18-bit (3×6 bit) width, as well as reads digital data corresponding to one horizontal scanning period, of the digital data of the luminance signal Y and the color difference signals R-Y and B-Y which are all thus written to the memory 39, at intervals of a predetermined number of horizontal scanning periods at speed higher than the writing speed, to perform time-base compression of the digital data. The PIP control circuit 34 separates the digital data of 18 bits as read out into respective data of 6 bits of the luminance signal Y and the color difference signals R-Y and B-Y, to output the same in a time divisional manner.

A D/A converter circuit 40 comprising three D/A converters of 6 bits (not shown) is connected to the PIP control circuit 34. Each of the digital data of 6 bits of the luminance signal Y and the color difference signals R-Y and B-Y which are read out from the memory 39 is applied to a corresponding D/A converter of 6 bits. The three D/A converters are responsive to a D/A clock signal applied from the PIP control circuit 34 for converting the applied digital data into an analog luminance signal Y and analog color difference signals R-Y and B-Y, respectively. The analog signals Y, R-Y and B-Y are further applied to a modulator circuit 41. On the other hand, a color synchronizing circuit 33 is responsvie to the gate pulse VG applied from the synchronizing signal separator circuit 32 for outputting a color synchronizing signal having a frequency of $f_{SC}$ which is synchronized with the video signal outputted from the switch 30, to apply the same to the modulator circuit 41. The modulator circuit 41 is responsive to the color synchronizing signal for modulating the luminance signal Y and the color difference signals R-Y and B-Y which are applied from the D/A converter circuit 40, to output the same. More specifically, a signal outputted from the modulator circuit 41 corresponds to the subscreen video signal obtained by reducing the screen caused by the video signal outputted from the switch 31.

A mixer circuit 42 combines the subscreen video signal outputted from the modulator circuit 41 and the character pattern signal for displaying the address outputted from the above described character generator 26, to apply the same to a terminal b' of a switch 43. On the other hand, the main screen video signal outputted from the switch 30 is inputted to a terminal a' of the switch 43. The switch 43 is controlled in response to an output of the PIP control circuit 34, to be switched from the contact a' to the contact b' only during insertion of the subscreen. Consequently, a PIP video signal in which a subscreen caused by the video signal outputted from the mixer circuit 42 is inserted into a part of the main screen caused by the video signal outputted from the switch 30 is formed and outputted from a video output terminal 44, to be applied to a monitor receiver (not shown) or the like externally provided.

Meanwhile, the main control circuit 18 and the PIP control circuit 34 comprise a microcomputer. A control program of an index scan function is previously stored in the main control circuit 18 while a control program of a PIP function is previously stored in the PIP control circuit 34.

Figure 3A:
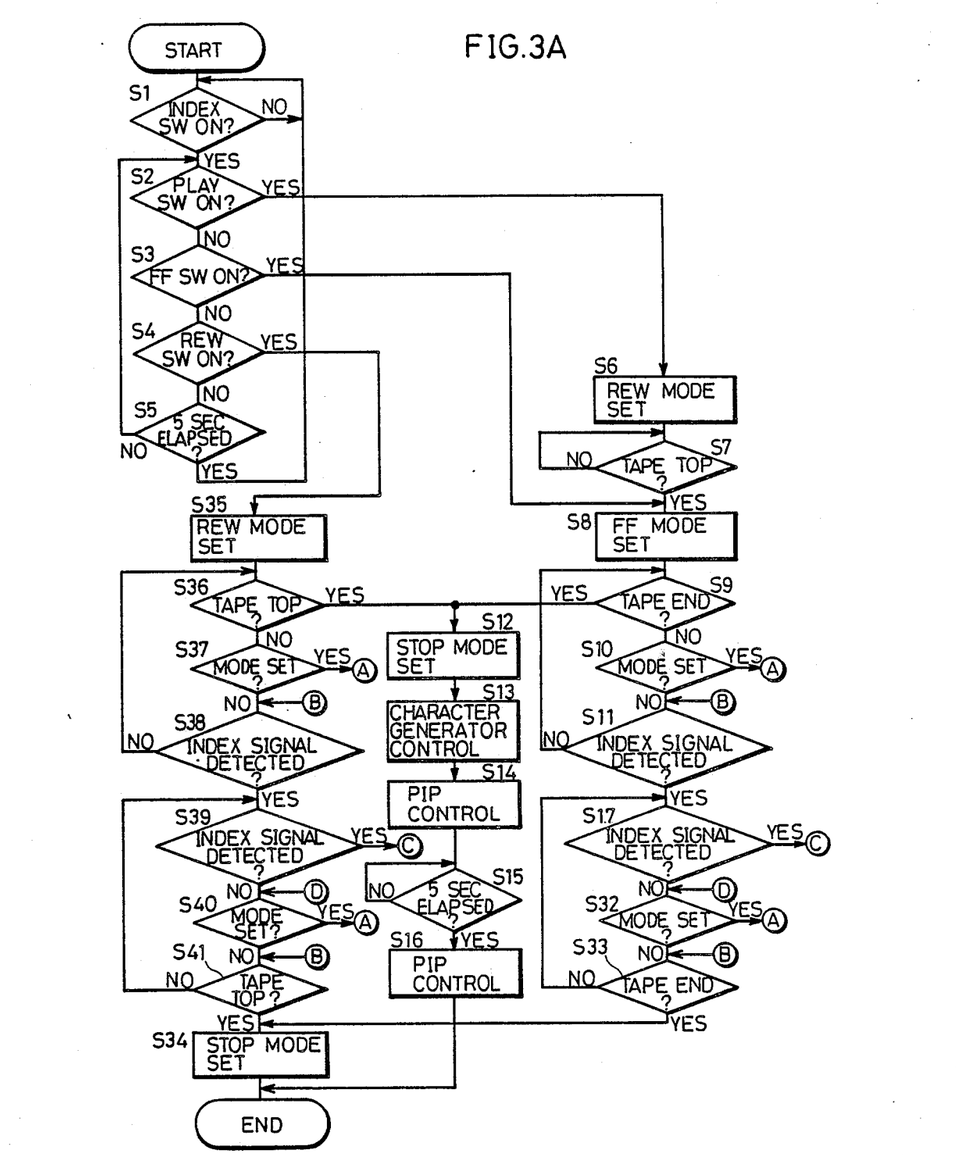
FIGS. 3A, 3B and 3C are flow charts for explaining an index scan operation of the VTR shown in FIG. 2.
Figure 3B:
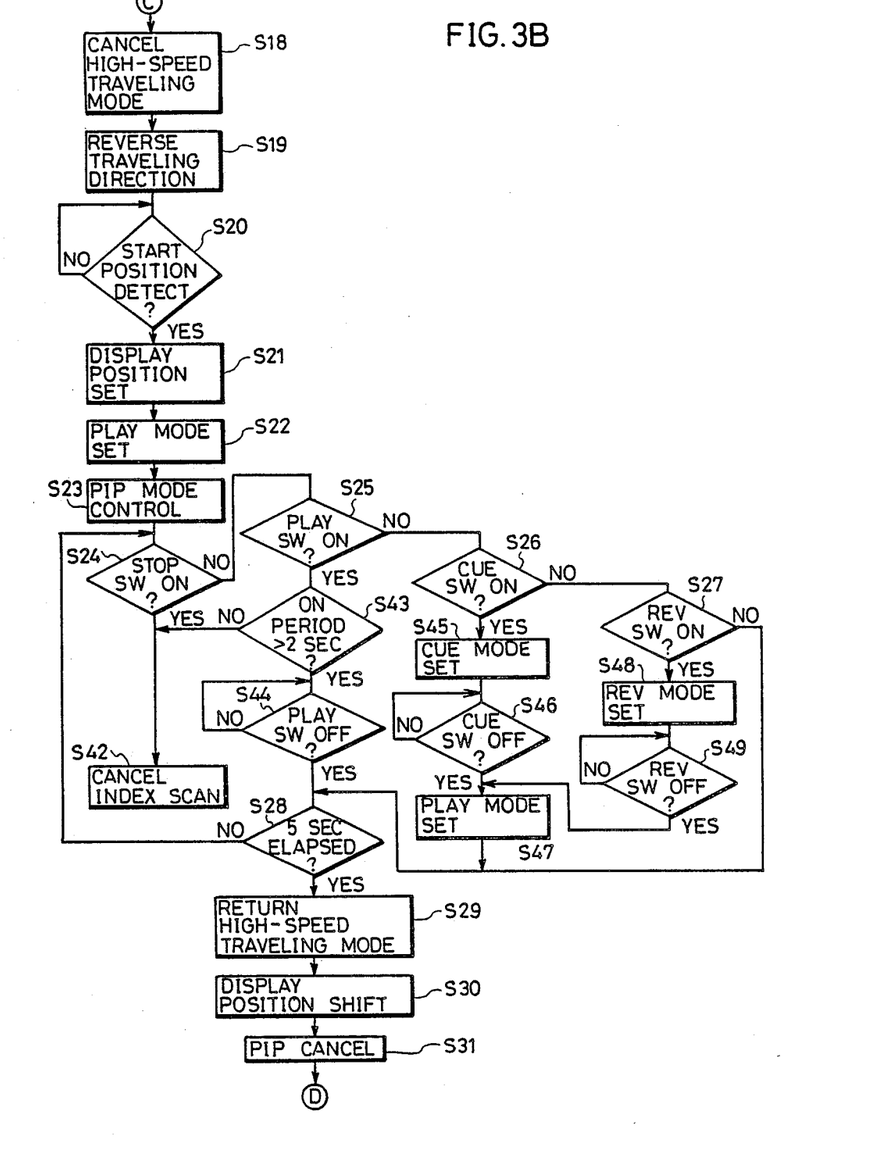
Figure 3C:
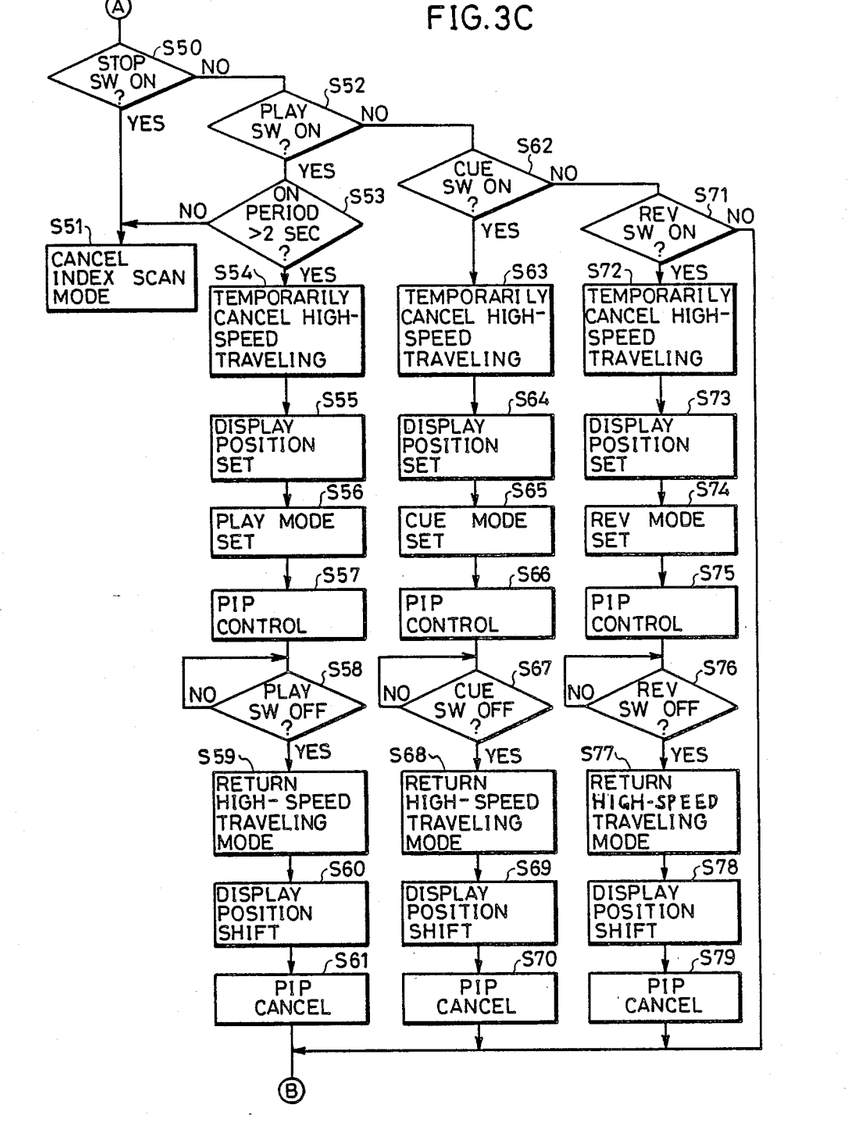
Figure 4A:
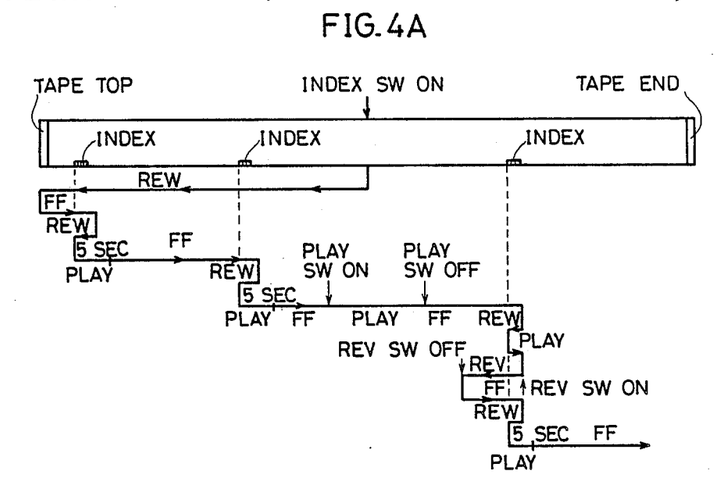
FIGS. 4A and 4B are typical diagrams showing an example of the operation shown in FIGS. 3A to 3C with time.
Figure 4B:
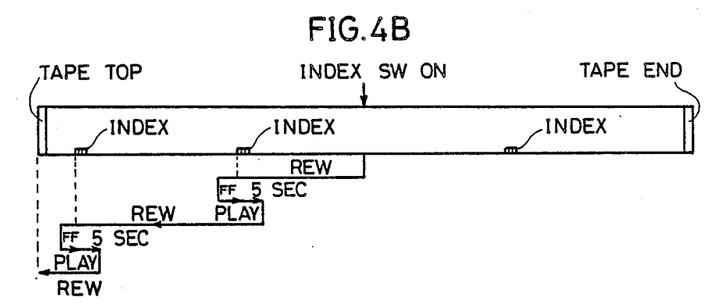

FIGS. 3A, 3B and 3C are flow charts for explaining an index scan operation of the VTR according to an embodiment of the present invention shown in FIG. 2. In addition, FIGS. 4A and 4B are typical diagrams showing a part of the operation shown in FIGS. 3A to 3C with time on the basis of the positional relation between a tape and a reproducing position. Referring now to FIGS. 2 to 4B, description is made on the index scan operation of the VTR according to an embodiment of the present invention.

First, it is assumed that the switches 30 and 31 shown in FIGS. 2 are held in the respective contacts a and the switch 43 is held in the contact a', the video signal received by the TV receiving antenna 27 and the TV tuner 28 and detected by the detector circuit 29 is applied to a monitor receiver (not shown) externally provided through the switches 30 and 43 and the output terminal 44, and a picture caused by the received television signal is displayed on the screen of the monitor receiver. In this case, when the index scan mode setting switch 21 is turned on (in the step S1), the main control circuit 18 accepts various key inputs of the operation mode setting switch 20. More specifically, any of the key inputs of a play (PLAY) switch, a fast forward (FF) switch and a rewind (REW) switch is accepted within five seconds after the index scan mode setting switch 21 is depressed (in the steps S2 to S5). When it is determined that the PLAY switch is tuned on (in the step S2), the main control circuit 18 sets a REW mode, and applies the control signal to the reel motor driving circuit 24, to rewind the tape 1 in the half-loading state or a tape unloading state (in the step S6 and in FIG. 4A).

When the tape 1 is completely rewound, light of a lamp (not shown) provided in the vicinity of, for example, the guide 7 is incident upon the tape top detecting sensor 16a through a transparent leader portion of the tape 1. The sensor 16a generates the tape top detecting signal to apply the same to the main control circuit 18. The main control circuit 18 is responsive to the output of the sensor 16a for determining whether or not the tape 1 is completely rewinded (in the step S7). When it is determined that the tape 1 is completely rewinded, fast forwarding of the tape 1 is performed (in the step S8 and in FIG. 4A). More specifically, the main control circuit 18 applies the control signal to the reel motor driving circuit 24 to rotate the reels at high speed. Consequently, fast forwarding of the tape 1 is performed in the half-loading state. During the above described high-speed traveling of the tape in the half-loading state, the reproduced state caused by the AC head 4, of the control track of a tape is maintained.

On the other hand, in the step S3, when it is determined that the FF switch is turned on within five seconds after the index scan mode setting switch 21 is depressed, the main control circuit 18 sets an FF mode, so that fast forwarding of the tape 1 is immediately performed without the above described rewinding (in the step S8).

Then, it continues to be circularly determined, respectively, whether or not the tape end is detected (in the step S9), any of the key inputs of the operation mode setting switch 20 is accepted (in the step S10), and the index detecting signal is generated from the index detecting circuit 17 (in the step S11). The tape end is determined in response to the detecting signal from the tape end detecting sensor 16b, similarly to the case of the above described tape top.

The index signal detecting circuit 17 identifies the duty ratio of the control pulse reproduced by the AC head 4 from the control track of the tape during the fast forward operation. More specifically, the index signal detecting circuit 17 determines whether or not the detected duty ratio exceeds 45%. The index signal detecting circuit 17 detects a succession of 60 reproduced control signals having the duty ratio of less than 45%, to generate an index detecting signal, and identifies an address signal subsequent to an index signal, to form identification data and output the same. The index detecting signal and the identification data as formed are inputted to the main control circuit 18.

When the tape end is detected (in the step S9) without detecting the index signal (in the step S11), the main control circuit 18 terminates fast forward control (in the step S12), and further applies to the character generator 26 a control signal indicating that the tape is a tape having the index signal recorded thereon (in the step S13). The character generator 26 responsively applies to the mixer circuit 42 the character pattern signal indicating that the tape is a tape having the index signal recorded thereon. In the step S14, the main control circuit 18 generates the PIP control signal and applies the same to the PIP control circuit 34, to instruct the start of the PIP operation. More specifically, in the index scan mode, when the received video signal from the tuner 28 and the detector circuit 29 is designated to be always displayed on the main screen, the switches 30 and 31 remain held in the respective contacts a. The PIP control circuit 34 performs PIP processing only for five seconds, to indicate on the subscreen that the index signal is not recorded. After five seconds elapsed (in the step S15), the main control circuit 18 instructs cancellation of PIP control (in the step S16), so that the index scan operation is terminated.

On the other hand, when the index signal is detected (in the steps S11 and S17), the starting portion of a program recorded on the tape is reproduced utilizing the PIP function over a short time period (five seconds), as shown in FIG. 4A. More specifically, the main control circuit 18 applies the control signal to the reel motor driving circuit 24 to cancel the high-speed traveling mode (in the step S18 shown in FIG. 3B) and then, reverses the traveling direction of the tape (in the step S19), and detects again the starting portion of the recorded program to determine the position where reproduction is started (in the step S20). However, reversing the traveling direction of the tape (in the step S19) is not necessarily required.

Then, in the step S21, the main control circuit 18 determines the display position of the subscreen in the main screen at the time of the PIP processing. For example, when the index scan operation is performed in the fast forward direction as shown in FIG. 4A, the display position is set such that the subscreen is displayed on the left of the main screen. In addition, when the index scan operation is performed in the rewind direction as shown in FIG. 4B as described below, it is assumed that the subscreen is displayed on the right of the main screen.

Then, in the step S22, the main control circuit 18 applies driving signals to the reel motor driving circuit 24 and the capstan driving circuit 25, to drive the reel motor 23 and the capstan motor 15 in the normal reproducing state for five seconds. In addition, the main control circuit 18 moves the pinch roller 14, to press the tape 1 on the capstan shaft 13. The video track of the tape 1 is reproduced for five seconds by both video heads (not shown) of the drum 11. In addition, the main control circuit 18 is responsive to the identification data from the index signal detecting circuit 17 for applying to the character generator 26 the control signal for displaying an address of a program during reproducing, of the programs. The character generator 26 responsively applies to the mixer circuit 42 a numerical pattern signal representing the address of the program during reproducing.

Figure 5A:
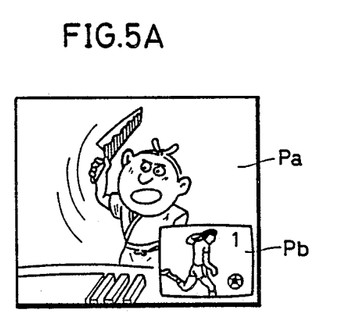
FIGS. 5A and 5B are diagrams for explaining picture-in-picture display according to an embodiment of the present invention.
Figure 5B:
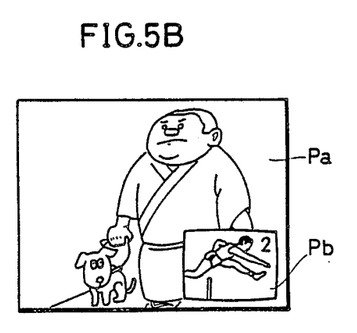

Then, in the step S23, the main control circuit 18 outputs the PIP control signal and applies the same to the PIP control circuit 34, to instruct the start of the PIP operation. The PIP control circuit 34 responsively performs the PIP processing over eight seconds. More specifically, during the PIP processing, the reproduced video signal corresponding to the subscreen is outputted from the modulator circuit 41. The reproduced video signal is combined with the numerical pattern signal from the character generator 26 by the mixer circuit 42. More specifically, a numeral representing the address is displayed to be suppressed on the reproduced image in the corner of a subscreen caused by the reproduced video signal. The received video signal from the switch 30 and the reproduced video signal from the mixer circuit 42 are combined by switching the switch 43. Consequently, as shown in, for example, FIGS. 5A and 5B, a video signal corresponding to a PIP screen in which a subscreen Pb caused by the reproduced video signal is inserted into a part of a main screen Pa caused by the received video signal is formed, and applied to the monitor receiver to be displayed on the screen thereof. On this occasion, as shown in FIGS. 5A and 5B, numerals 1 and 2 representing address are simultaneously displayed on the subscreen Pb.

It is determined that any of the key inputs of the operation mode setting switch 20 is accepted for five seconds during which the PIP processing is performed (in the steps S24 to S28). If there is no key input, the main control circuit 18 gives an instruction to return the VTR to the high-speed traveling mode (in the step S29), so that the fast forward operation of the tape 1 is resumed as shown in FIG. 4A. In addition, in the step S30, the reproduced video signal of one field or one frame immediately before the end of the reproducing period is held in the memory 39, to be displayed on the subscreen as a still picture. The display position of the subscreen is shifted from the left to the right for three seconds, to indicate that the tape traveling direction is the fast forward direction.

Then, in the step S31, the main control circuit 18 stops outputting the PIP control signal, to cancel the PIP operation performed by the PIP control circuit 34. Thus, the subscreen disappears from the screen of the monitor receiver, so that only the main screen caused by the received video signal is displayed. The main control circuit 18 determines cyclically while fast forwarding the tape in the half-loading state, respectively, whether or not the index signal is detected (in the step S31), any of the key inputs of the operation mode setting switch 20 is accepted (in the step S32) and the tape end is detected (in the step S33). Until the tape end is detected, monitoring of the above described index signal (in the step 17) and reproducing of the starting portion of the recorded program (in the step S18 to S31) are repeated. When the tape reaches the end thereof, the main control circuit 18 sets an operation stop mode (in the step S34), so that the index scan operation is terminated.

On the other hand, when the index scan mode setting switch 21 is depressed (in the step S1) and then, it is determined that the REW switch is turned on within five seconds (in the step S4), the main control circuit 18 sets the REW mode and applies the control signal to the reel motor driving circuit 24, so that the tape 1 is rewinded in the half-loading state (in the step S35 and in FIG. 4B). The main control circuit 18 determines cyclically, respectively, whether or not the tape top is reached (in the step S36), any of the key inputs of the operation mode setting switch 20 is accepted (in the step S37), the index detecting signal is generated from the index signal detecting circuit 17 (in the step S38).

When the tape top is detected (in the step S36) without detecting the index signal (in the step S38), the main control circuit 18 terminates rewind control (in the step S12). The operations in the following steps S12 to S16 are the same as described above.

On the other hand, when the index signal is detected (in the steps S38 and S39), the starting portion of the recorded program of the tape is displayed on the subscreen of the PIP display over eight seconds. The processing steps S18 to S31 at the time of the PIP operation have been already described and hence, the description thereof is omitted herein. When the PIP control is cancelled in the step S31, it is determined whether or not any of the key inputs of the operation mode setting switch 20 is accepted (in the step S40) and the tape top is reached (in the step S41), respectively. As shown in FIG. 4B, monitoring of the above described index signal (in the step S39) and reproducing of the starting portion of the recorded program (in the steps S18 to S31) are repeated until the tape top is detected. When the tape top is reached, the main control circuit 18 sets the operation stop mode (in the step S34), so that the index scan operation is terminated.

As described in the foregoing, the index scan mode is set by the operation of the index scan mode setting switch 21, to simultaneously operate the index scan function and the PIP function, so that the screen caused by the received video signal of the contained tuner 28 and the starting portion of each program recorded on the tape obtained through index scanning can be simultaneously monitored.

More specifically, during the high-speed traveling of the tape, only a picture caused by the received video signal is displayed on the screen of the monitor receiver. On the other hand, when the index signal is detected, the starting portion of the recorded program is displayed on the subscreen by the PIP processing only in a constant time period (for five seconds). When the constant time period elapsed, the subscreen is shifted for three seconds corresponding to the traveling direction of the tape and then, the PIP processing is stopped, so that only the received video signal is displayed again on the screen of the monitor receiver until the next index signal is detected.

However, since the period during which the starting portion of the recorded program is reproduced on the subscreen is determined to be, for example, five seconds, it is necessary that the contents in the vicinity of the position where the index signal is detected, i.e., the starting position of the recorded program can be seen in a desired operation mode over a longer time period when it is desired by user of the VTR.

The index signal is detected as described above (in the step S17) and the start of the PIP operation is further instructed (in the step S23) and then, any of the key inputs of the operation mode setting switch 20 is accepted. More specifically, when it is determined that the STOP switch is turned on (in the step S24), the index scan operation is terminated (in the step S42).

Additionally, when it is determined that the PLAY switch is turned on (in the step S25), it is further determined whether or not the on period is two seconds or more (in the step S43). More specifically, if the on period of the PLAY switch is a short period of less than two seconds, it is obvious that a user does not desire to temporarily monitor the starting portion but to fully reproduce the recorded program in the normal reproducing mode, so that the index scan operation is cancelled (in the step S42). On the other hand, if the on state of the PLAY switch lasts for two seconds or more (in the step S43), the normal reproducing is performed so that the PIP operation is continued so long as the PLAY switch is turned on (in the step S44). If a predetermined time period, i.e., five seconds has already elapsed (in the step S28) when the on state of the PLAY switch is terminated, the main control circuit 18 immediately gives an instruction to return the VTR to the high-speed traveling mode (in the step S29), so that the PIP operation is cancelled through the above described steps S30 and S31.

Additionally, when the PIP operation is started (in the step S23) and then, it is determined that the CUE switch is turned on (in the step S26), a CUE mode is set (in the step S45). The CUE mode is maintained so long as the CUE switch is turned on, so that a cue screen is displayed on the subscreen (in the step S46). When the on state of the cue switch is terminated, the VTR proceeds to a PLAY mode (in the step S47). When five seconds elapsed after the PIP processing is started (in the step S28), the VTR immediately returns to the high-speed traveling mode (in the step S29). Consequently, the PIP operation is cancelled through the above described steps S30 and S31.

Additionally, when the PIP operation is started (in the step S23) and then, it is determined that the REV switch is turned on (in the step S27), the REV mode is set (in the step S48). The REV mode is maintained so long as the REV switch is turned on, so that an REV screen is displayed on the subscreen (in the step S49). When the on state of the REV switch is terminated, the VTR proceeds to the PLAY mode (in the step S47). When five seconds elapsed after the PIP processing is started (in the step S28), the VTR returns to the high-speed traveling mode immediately (in the step S29). Consequently, the PIP operation is cancelled through the above described steps S30 and S31.

Although the foregoing description is related to the time of setting an FF mode (in the step S8), the description is also applied to the PIP operation at the time of setting the REW mode (in the step S39).

Additionally, in the above described embodiment, when the time interval between the index signals recorded on the tape is long, a picture caused by the received video signal or the externally inputted video signal continues to be displayed on the monitor receiver during the time interval, so that the subscreen caused by the PIP processing is not displayed. Thus, during the time interval, a user of the VTR can not know the state of the contents recorded on the tape during high-speed traveling or the direction in which the tape is traveling at high speed. Consequently, even during the high-speed traveling mode of the tape, it is necessary that the contents recorded on the tape can be seen in a desired reproducing mode over a required time period if it is desired by the user.

Before the index signal is detected after the FF mode is set in, for example, the above described step S8, any of the key inputs of the operation mode setting switch 20 is accepted (in the step S10). More specifically, when it is determined that the STOP switch is turned on (in the step S50 shown in FIG. 3C), the index scan operation is terminated (in the step S51).

Additionally, when it is determined that the PLAY switch is turned on (in the step S52) before the index signal is detected, it is determined whether or not the on period is two seconds or more (in the step S53). More specifically, if the on period of the PLAY switch is a short period of less than two seconds, it is obvious that a user does not desire to temporarily monitor the recorded contents but to fully reproduce the recorded program in the normal reproducing mode, so that the index scan operation is cancelled (in the step S51). On the other hand, if the on state of the PLAY switch lasts for two seconds or more (in the step S53), the main control circuit 18 temporarily cancels the high-speed traveling mode (in the step S54), and determines the display position of the subscreen on the left (in the step S55). The main control circuit 18 sets the PLAY mode (in the step S56), and displays a picture caused by the reproduced video signal on the subscreen by the PIP processing so long as the PLAY switch continues to be depressed (in the steps S57 and S58). When the on state of the PLAY switch is terminated (in the step S58), the main control circuit 18 gives an instruction to return the VTR to the high-speed traveling mode (in the step S59), shifts the display position of the subscreen in the right direction (in the step S60) and then, cancels the PIP control (in the step S61).

On the other hand, when it is determined that the CUE switch is turned on before the index signal is detected (in the step S62), the main control circuit 18 temporarily cancels the high-speed traveling mode (in the step S63), and determines the display position of the subscreen on the left (in the step S64). The main control circuit 18 sets the CUE mode (in the step S65), and displays on the subscreen the CUE picture caused by the reproduced video signal by the PIP processing so long as the CUE switch continues to be depressed (in the steps S66 and S67). When the on state of the CUE switch is terminated (in the step S67), the main control circuit 18 gives an instruction to return the VTR to the high-speed traveling mode (in the step S68), shifts the display position of the subscreen in the right direction (in the step S69) and then, cancels the PIP control (in the step S70).

Additionally, when it is determined that the REW switch is turned on before the index signal is detected (in the step S71), the main control circuit 18 temporarily cancels the high-speed traveling mode (in the step S72), and determines the display position of the subscreen on the left (in the step S73). The main control circuit 18 sets the REV mode (in the step S74), and displays on the subscreen the REV picture caused by the reproduced video signal by the PIP processing so long as the REV switch continues to be depressed (in the steps S75 and S76). When the on state of the REV switch is terminated (in the step S76), the main control circuit 18 gives an instruction to return the VTR to the high-speed traveling mode (in the step S77), shift the display position of the subscreen in the right direction (in the step S78) and then, cancels the PIP control (in the step S79).

Additionally, the above described desired operation mode is established not only before the first index signal is detected in the FF mode (in the step S10) but also before the next index signal is detected after the index signal is detected (in the step S32). In addition, the operation mode is also established (in the steps S37 and S40) when the REW mode is set (in the step S35). However, at the time of setting the REW mode, the display position of the subscreen is on the right and the shifting direction of the subscreen is the left direction.

As described in the foregoing, according to the present invention, even when the index scan operation of the starting portion of the recorded program is not performed, the contents recorded on the tape can be reproduced by the PIP processing in a desired operation mode over an arbitrary time period, so that the reproduced picture and the high-speed traveling direction of the tape can be displayed to meet the requirements of a user.

Figure 6:
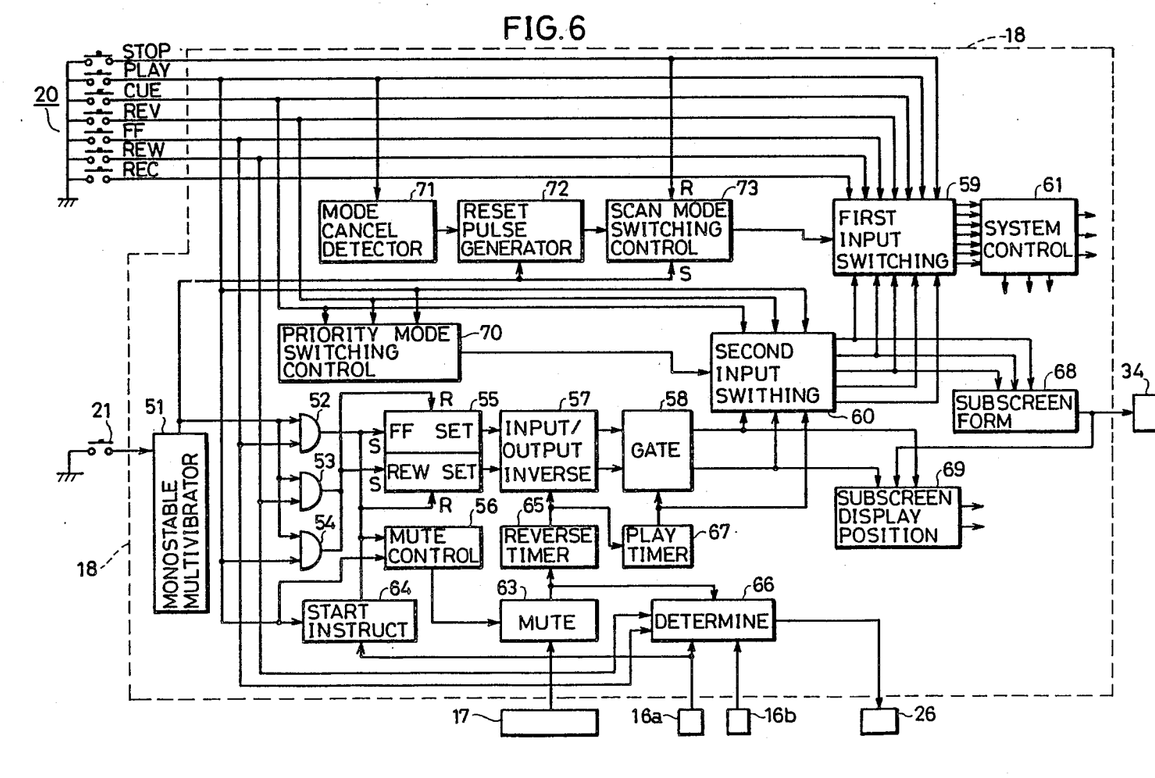
FIG. 6 is a block diagram showing structure in which a main control circuit 18 shown in FIG. 2 is implemented in a hardware manner.

Although the foregoing description is related to the case in which a microcomputer 18 is applied to the main control circuit 18 so that the index scan control is achieved in a software manner, such control can be also achieved in a hardware manner. FIG. 6 is a block diagram showing structure in which the main control circuit 18 shown in FIG. 2 is achieved in a hardware manner.

Referring now to FIG. 6, description is made on the index scan control according to an embodiment of the present invention.

First, when the index scan mode setting switch 21 is turned on, a monostable multivibrator 51 responsively outputs a signal of an "H" level in a predetermined time period (for example, for five seconds). The signal of the "H" level sets a scan mode switching control circuit 73, so that a first input switching circuit 59 selects an output of a second input switching circuit 60. In the period during switch output of the monostable multivibrator 51 is at the "H" level, any of switches such as the FF switch, the REW switch and the PLAY switch, of various keys of an operation mode setting switch 20 is turned on, a corresponding gate, of AND gates 52, 53, and 54 is opened.

More specifically, when the PLAY switch is turned on, an FF setting circuit 55 is reset and an REW setting circuit 56 is set, by an output of the AND gate 54. Outputs of the setting circuits 55 and 56 are directly applied to a system control circuit 61 through an input/output inverting circuit 57 in a non-operated state, a gate circuit 58 in an opened state, the second input switching circuit 60 and the first input switching circuit 59. The system control circuit 61 applies a control signal to the reel motor driving circuit 24 in response to a set output, to achieve scanning in a rewind direction in the half-loading state, i.e., the REW mode. In the REW mode, the above described PLAY switch is turned on to drive a mute control circuit 62, so that a mute designation signal is applied to a mute circuit 63. More specifically, during the REW mode, an index signal from an index signal detecting circuit 17 is muted, so that the index signal is not detected until a sensor 16a detects the tape top.

When the sensor 16a detects the tape top, i.e., completion of rewinding, a start instructing circuit 64 responsively sets the FF setting circuit 55 and resets the REW setting circuit 56. The system control circuit 61 responsively applies the control signal to the reel motor driving circuit 24, to achieve scanning in the fast forward direction in the half-loading state, i.e., the FF mode. In addition, the mute control circuit 62 is responsive to an output of the start instructing circuit 64 for cancelling mute control of the index signal. Subsequently, the index signal detected from the index signal detecting circuit 17 is applied to a reverse timer 65 and a circuit 66 for determining that the index signal is not detected. The determining circuit 66 is responsive to the index signal and the tape top and end detecting signals for determining that the index signal is not recorded on the tape at all and informing the character generator 26 of the determination.

When the index signal is detected after the FF mode is started, the reverse timer 65 responsively sets a predetermined tape reversing period, to drive the input/output inverting circuit 57. The input/output inverting circuit 57 inverts the set outputs of the setting circuit 55 and 56 only in the predetermined reversing period, to reverse the tape to the position where reproducing is started. Meanwhile, when the tape needs not to be traveled in a reverse direction, the input/output inverting circuit 57 and the reverse timer 65 are not required. In addition, a play timer 67 sets a reproducing period (five seconds as described above in the present embodiment) of the tape top after the tape reversing period, to drive the gate circuit 58. The gate circuit 58 is closed to inhibit fast forwarding of the tape only in such a predetermined time period. During such a predetermined time period, a subscreen formation instructing circuit 68 is responsive to the output of the second switching circuit 60 for generating a PIP control signal to apply the same to a PIP control circuit 34. When the play timer 67 detects the end of the predetermined time period, inhibition of fast forwarding of the tape by the gate circuit 58 is cancelled, so that the FF mode is resumed.

On the other hand, when the FF switch is turned on in the period during which the output of the monostable multivibrator 51 is at the "H" level, the FF setting circuit 55 is set and the REW setting circuit 56 is reset immediately by an output of the AND gate 52. The system control circuit 61 responsively starts the FF mode. On this occasion, since the mute control circuit 62 is not driven, detection of the index signal is started simultaneously with the start of the FF mode. Processing at the time of detecting the index signal is as described above.

Furthermore, when the REW switch is turned on in the period during which the output of the monostable multivibrator 51 is at the "H" level, the FF setting circuit 55 is reset and the REW setting circuit 56 is set immediately by an output of the AND gate 53. The system control circuit 61 responsively starts the REW mode. On this occasion, since the mute control circuit 62 is not driven, detection of the index signal is started simultaneously with the start of the REW mode. Processing at the time of detecting the index signal is as described above. Meanwhile, a subscreen display position designating circuit 69 is responsive to the FF mode or the REW mode for setting the display position of the subscreen in the main screen at the time of the PIP processing, as described below.

In the above described case, the second input switching circuit 60 selects inputs from the gate circuit 58 and the play timer 67 to output the same. In this case, when any of the switches such as the PLAY switch, the cue switch and the REV switch is depressed, a priority mode switching control circuit 70 applies a control signal to the second input switching circuit 60. The second input switching circuit 60 is responsive to the control signal for selecting a key input of any of the PLAY switch, the CUE switch and the REV switch in place of the output from the gate circuit 58, to apply the same to the system control circuit 61 through the first input switching circuit 59. More specifically, so long as the respective switches such as the PLAY switch and the REW switch are depressed, the key inputs thereof are applied to the system control circuit 61 by priority, so that a reproducing mode desired by a user is achieved over an arbitrary time period, to be monitored in the subscreen.

Additionally, a mode cancellation detecting circuit 71 determines that the PLAY switch is turned on in a short time period of, for example, less than two seconds. A reset pulse generating circuit 72 applies a mode cancellation detecting output generated after the fall of the output of the "H" level of the monostable multivibrator 51, as a reset pulse, to the scan mode switching control circuit 73. The scan mode switching control circuit 73 is reset when it receives the reset pulse or it directly receives an input of the STOP key. The first input switching circuit 59 responsively selects any of the key inputs of the operation mode setting switch 20 in place of the output of the second input switching circuit 60 to apply the same to the system control circuit 61. Consequently, if the index scan mode is to be cancelled since normal reproducing is desired, it is necessary to depress the PLAY switch in a short time period to meet the requirement.

Figure 7:
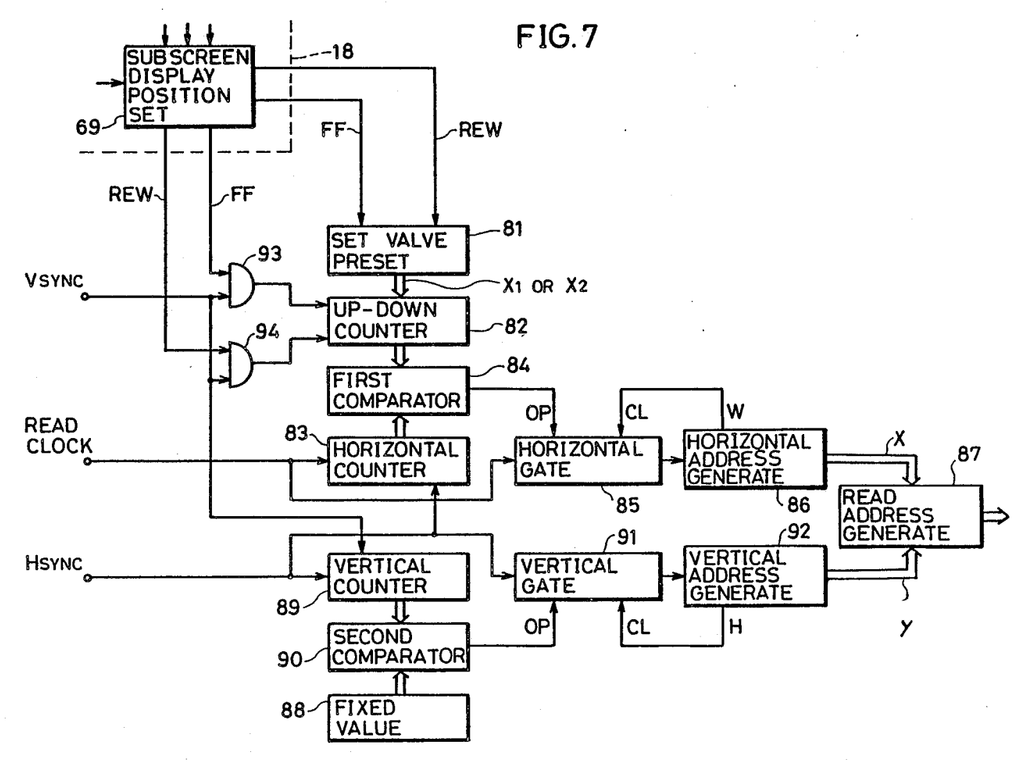
FIG. 7 is a block diagram showing a circuit for determining the position of a subscreen in a main screen at the time of PIP processing.

FIG. 7 is a block diagram showing a circuit for setting the position of the subscreen in the main screen at the time of the above described PIP processing, and shifting the subscreen comprising a still picture at the time when reproducing mode is terminated, in a predetermined direction after the termination.

Figure 8A:
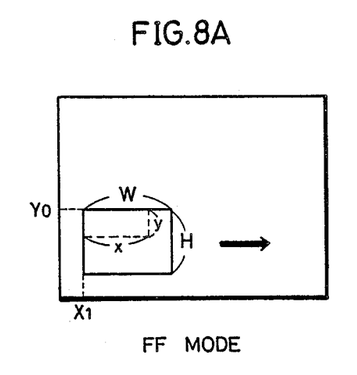
FIGS. 8A and 8B are typical diagrams showing a state in which the display position of the subscreen in the main screen is shifted.
Figure 8B:
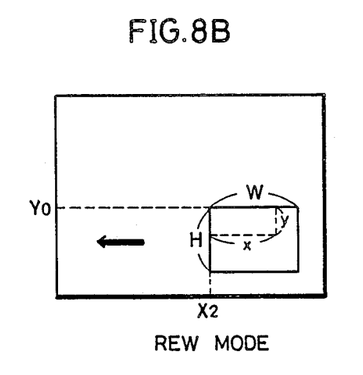

Additionally, FIGS. 8A and 8B are typical diagrams showing the state in which the display position of the subscreen is shifted. In FIG. 7, a subscreen display position instructing circuit 69 in the main control circuit 18 is responsive to the output of the gate circuit 58 and the output of the subscreen formation instructing circuit 68 for designating the display position at the time of forming the subscreen and the direction at the time of shifting the subscreen. The display position and the shifting direction are specified by a first instructing signal and a second instructing signal, respectively. First, the subscreen position instructing circuit 69 applies an instructing signal to a set value presetting circuit 81 in an FF mode. The set value presetting circuit 81 responsively presets a value $X_1$ in an up-down counter 82. The value is a value of the coordinate of the starting portion in a horizontal direction of a scan line constituting the subscreen, as shown in FIG. 8A. On the other hand, a read clock obtained by subdividing one horizontal period is applied to a horizontal counter 83. The values of the horizontal counter 83 and the up-down counter 82 are compared with each other by a first comparator circuit 84. When both values coincide with each other, i.e., when the value of the coordinate in the horizontal direction of the scan line reaches $X_1$, the first comparator circuit 84 applies a signal to a horizontal gate 85, which gate opened. A horizontal address generating circuit 86 is responsive to the read clock inputted through the horizontal gate 85 for generating a horizontal address x for forming the subscreen to apply the same to a read address generating circuit 87. When the generated address reaches a fixed length W in the horizontal direction of the subscreen as shown in FIG. 8A, the horizontal address generating circuit 86 applies a signal to the horizontal gate 85, which gate is closed. The horizontal counter 83 is reset in response to a horizontal synchronizing signal $H_{SYNC}$ for every horizontal period.

On the other hand, $Y_0$, which is a value of the coordinate of the starting portion in a vertical direction of the scan line constituting the subscreen as shown in FIG. 8A, is set in a fixed value setting circuit 88. In addition, the horizontal synchronizing signal $H_{SYNC}$ is inputted to a vertical counter 89. The value of the vertical counter 89 and the fixed value $Y_0$ are compared with each other by the second comparator circuit 90. When both values coincide with each other, i.e., when the value of the coordinate in the vertical direction of the scan line reaches the fixed value $Y_0$, the second comparator circuit 90 applies a signal to a vertical gate 91, which gate is opened. A vertical address generating circuit 92 is responsive to a horizontal synchronizing signal $V_{SYNC}$ inputted through the vertical gate 91 for generating a vertical address y for forming the subscreen to apply the same to the read address generating circuit 87. When the generated address reaches a fixed length H in the vertical direction of the subscreen as shown in FIG. 8A, the vertical address generating circuit 92 applies a signal to the vertical gate 91, which gate is closed. The vertical counter 89 is reset in response to the vertical synchronizing signal $V_{SYNC}$ for every one screen.

The read address generating circuit 87 forms a read address to access a memory 39 for time-base compression only in the period during which the horizontal address x and the vertical address y are simultaneously applied. Consequently, a digital video signal for a subscreen corresponding to the coordinate (x, y) in the subscreen shown in FIG. 8A is read out from the memory 39.

As described in the foregoing, in the FF mode, the subscreen is displayed in a region on the left determined by the coordinate ($X_1$, $Y_0$) and the fixed values W and H in the main screen as shown in FIG. 8A. On the other hand, the subscreen display position setting circuit 69 applies an instructing signal to the set value presetting circuit 81 in the REW mode. The set value presetting circuit 81 responsively presets a value $X_2$ in the up-down counter 82. The value is a value of the coordinate of the starting portion in the horizontal direction of the scan line constituting the subscreen, as shown in FIG. 8B. The operation in this case is the same as that in the above described FF mode. However, since the value preset in the up-down counter 82 is not $X_1$ but $X_2$, the subscreen is displayed in a region on the right determined by the coordinate ($X_2$, $Y_0$) and the fixed values W and H as shown in FIG. 8B in the REW mode.

Meanwhile, since a digital video signal for a final picture at the time of the PIP processing is held in the memory 39, this picture can be displayed on the subscreen as a still picture. If the display position of the subscreen is shifted in a predetermined direction over a predetermined time period after reproducing of the starting portion of the recorded program is terminated, a user can be simply informed of the tape traveling mode after the PIP control is cancelled.

In the FF mode, the subscreen display position setting circuit 69 applies the second instructing signal to an AND gate 93 within a predetermined time period from the time when reproducing of the starting portion of the recorded program is terminated to the time when the PIP control is cancelled. During this time period, the vertical synchronizing signal $V_{SYNC}$ is applied to the up-down counter 82 through the AND gate 93, so that the value of the counter 82 is incremented for every one screen. More specifically, the coordinate $X_1$ in the horizontal direction shown in FIG. 8A increases, so that the subscreen moves in a right direction for every one screen. Consequently, the user can know that the VTR is currently in the FF mode of scanning in a positive direction.

On the other hand, in the REW mode, the subscreen display position setting circuit 69 applies the second instructing signal to an AND gate 94. During this time period, the vertical synchronizing signal $V_{SYNC}$ is applied to the up-down counter 82 through the AND gate 94, so that the value of the counter 82 is decremented for every one screen. More specifically, the coordinate $X_2$ in the horizontal direction shown in FIG. 8B decreases, so that the subscreen moves in the left direction for every one screen. Consequently, the user can know that the VTR is currently in the REW mode of scanning in the rewind direction. If the second instructing signal is generated simultaneously with the start of the PIP control, the subscreen continues to be shifted during reproducing, so that the user can easily know the high-speed traveling direction of the tape.

Figure 9:
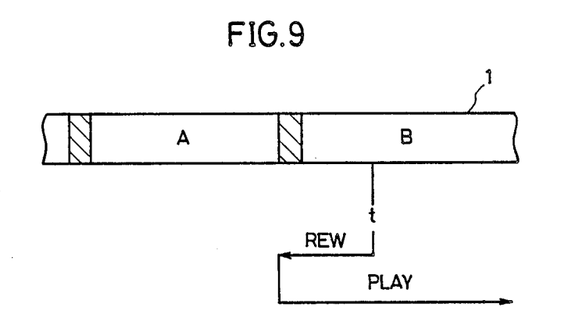
FIG. 9 is a typical diagram for explaining an operation to occur when a user designates a desired program.

It is assumed that a user desires to see the specified program, for example, a program B during monitoring of the programs A to D shown in FIG. 1. FIG. 9 is a typical diagram showing an operation performed in such a case with time on the basis of the positional relation between the tape and the reproducing position.

First, in this case, the user inputs the number specifying the program B by operating the address designating switch 22 comprising a ten-key switch at the time t during monitoring of, for example, the program B. The main control circuit 18 responsively rewinds the tape 1 immediately in the half-loading state. When the address based on the identification data from the index signal detecting signal 17 and a desired address inputted from the switch 22 coincide with each other during rewinding of the tape, the main control circuit 18 stops rewinding of the tape as well as reproduces in a normal manner the recorded program from the starting portion of the program B with the tape being in a normal loading state. The main control circuit 18 instructs cancellation of the PIP control, and switches the switches 30 and 31 to the contact b and the switch 43 to the contact a', to display the contents of the program B on the screen of the monitor receiver.

Although in the above described embodiment, the picture caused by the reproduced video signal is displayed on the subscreen while the picture caused by the received video signal is displayed on the main screen at the PIP processing, control of the switches 30 and 31 can be reversed so that the picture caused by the reproduced video signal is displayed on the main screen while the picture caused by the received video signal is displayed on the subscreen. More specifically, in such structure, the picture caused by the received video signal which is generally displayed on the screen of the monitor receiver is displayed on the subscreen only at the time of the PIP control and the picture is returned again on the screen of the monitor receiver after the PIP control is cancelled.

Furthermore, although in the above described embodiment, the picture caused by the received video signal of an internal tuner is monitored simultaneously with index scanning of the tape, a picture caused by an externally inputted video signal maybe monitored.

Additionally, although in the above described embodiment, the present invention is not limited to the above described index signals recorded on the control track of the tape which are obtained using the VISS and the VASS. For example, the present invention can be applied to index signals of various systems, for example, an index signal recorded on the position other than the control track of the tape.

Additionally, although in the above described embodiment, the subscreen is shifted in a short time period immediately before the PIP control is cancelled, the subscreen may be shifted for five seconds of the PIP operation. Thus, it is necessary to be adapted such that the second instructing signal is generated immediately after the first instructing signal is generated.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An index scan system in a video tape recorder for reproducing the contents recorded on a magnetic tape (1) having an index signal recorded in the starting position of each recorded program, comprising:
    means (21) for setting an index scan mode,
    means (18, 23, 24) responsive to setting of said index scan mode for traveling said magnetic tape at high speed in either one of a positive direction and a reverse direction, means (4, 17) for detecting said index signal during the high-speed traveling of said magnetic tape, means (11, 18, 19) for reproducing the starting portion of the recorded program in a short time period every time said index signal is detected, means (30-43) for forming a picture-in-picture screen by combining a main screen corresponding to a video signal received by a tuner contained in said video tape recorder with a subscreen corresponding to a video signal reproduced from said magnetic tape, and output selecting means (18, 34, 43, 44) for selecting said received video signal during high-speed traveling of said magnetic tape to output the same while selecting an output of said picture-in-picture screen forming means during reproducing of said magnetic tape to output the same.

2. An index scan system according to claim 1, wherein
said picture-in-picture screen forming means comprises means for changing the display position of said subscreen depending on the high-speed traveling direction of said magnetic tape.

3. An index scan system according to claim 1, wherein
said picture-in-picture screen forming means comprises means for moving the display position of said subscreen depending on the high-speed traveling direction of said magnetic tape.

4. An index scan system according to claim 2, wherein
said picture-in-picture screen forming means comprises means for moving the display position of said subscreen depending on the high-speed traveling direction of said magnetic tape.

5. An index scan system according to claim 1, which further comprises means for setting said video tape recorder to any of a normal reproducing mode, a cue reproducing mode and a review reproducing mode,
said output selecting means interrupting said index scan mode during operation of said reproducing mode setting means, to set said video tape recorder to a corresponding reproducing mode, and selecting an output of said picture-in-picture screen forming means to output the same.

6. An index scan system according to claim 5, wherein
said picture-in-picture screen forming means comprises means for changing the display position of said subscreen depending on the high-speed traveling direction of said magnetic tape.

7. An index scan system according to claim 5, wherein
said picture-in-picture screen forming means comprises means for moving the display position of said subscreen depending on the high-speed traveling direction of said magnetic tape.

8. An index scan system according to claim 6, wherein
said picture-in-picture screen forming means comprises means for moving the display position of said subscreen depending on the high-speed traveling direction of said magnetic tape.

* * * * *

UNITED STATES PATENT AND TRADEMARK OFFICE
CERTIFICATE OF CORRECTION

PATENT NO. : 4,890,168
DATED : December 26, 1989
INVENTOR(S) : INOUE et al

It is certified that error appears in the above-identified patent and that said Letters Patent is hereby corrected as shown below:

On the cover page, Item [30], "[DE] Fed. Rep. of Germany"

should read --[JP] Japan--.

Signed and Sealed this

Nineteenth Day of March, 1991

Attest:

HARRY F. MANBECK, JR.

*Attesting Officer*  *Commissioner of Patents and Trademarks*